United States Patent [19]

Lewis et al.

[11] 4,326,154
[45] Apr. 20, 1982

[54] REGENERATIVE BRAKING CONTROL FOR A TRANSIT VEHICLE

[75] Inventors: Robert R. Lewis, Churchill Borough; Donald C. Graham, Monroeville Borough, both of Pa.

[73] Assignee: Westinghouse Electric Corp., Pittsburgh, Pa.

[21] Appl. No.: 967,821

[22] Filed: Dec. 8, 1978

[51] Int. Cl.³ .............................................. H02P 3/14
[52] U.S. Cl. ..................................... 318/376; 318/370
[58] Field of Search ............... 318/370, 376, 371, 378; 307/64, 66; 246/187 R; 104/194

[56] References Cited

U.S. PATENT DOCUMENTS

| 3,657,625 | 4/1972 | Miller et al. | 318/370 |
| 4,057,753 | 11/1977 | Perry et al. | 318/376 |
| 4,093,900 | 6/1978 | Plunkett | 318/370 |

Primary Examiner—David Smith, Jr.
Attorney, Agent, or Firm—R. G. Brodahl

[57] ABSTRACT

There is disclosed apparatus for controlling the regenerative braking of a transit vehicle by sensing the operation of the power source third rail for that transit vehicle for the purpose of preventing regeneration of power by a moving vehicle into that power source rail when it has been determined that the power source third rail is not receptive during the regenerative braking effort of that vehicle.

6 Claims, 3 Drawing Figures

REGENERATIVE BRAKING CONTROL FOR A TRANSIT VEHICLE

BACKGROUND OF THE INVENTION

A typical electrical transit vehicle includes propulsion equipment and various auxiliary apparatus that draw current from a power source third rail through pickup devices positioned at the front end of the vehicle and at the rear end of the vehicle. The provision of regenerative braking of that vehicle to stop the vehicle and supply power back into the third rail is described in an article entitled, "Alternative Systems for Rapid Transit Propulsion and Electrical Braking" by B. J. Krings, published in the March, 1973 Westinghouse Engineer. The resulting voltage across the line filter capacitor has been monitored to determine the receptivity of that third rail for such regenerative power such that if the capacitor voltage goes above a preset limit, then the regenerative braking is terminated and either dynamic braking or friction braking is used to stop the vehicle. The latter operation is disclosed in U.S. Pat. No. 3,657,625 of Miller et al. and assigned to the assignee of the present invention.

It is known in the prior art, as disclosed in U.S. Pat. No. 4,057,753 of R. H. Perry et al. to provide a permissive control signal which is inserted into the electrical power supplied to the vehicle for establishing when regenerative braking will occur and it is desired for the external power supply to receive regenerated power from the vehicle.

SUMMARY OF THE INVENTION

A regenerative braking control for a transit vehicle is provided wherein the current flow between the vehicle and the third rail power source is measured for preventing regeneration into the third rail until it has been established that the third rail is alive and capable of supplying current to the vehicle.

DESCRIPTION OF A PREFERRED EMBODIMENT

Figure 1:
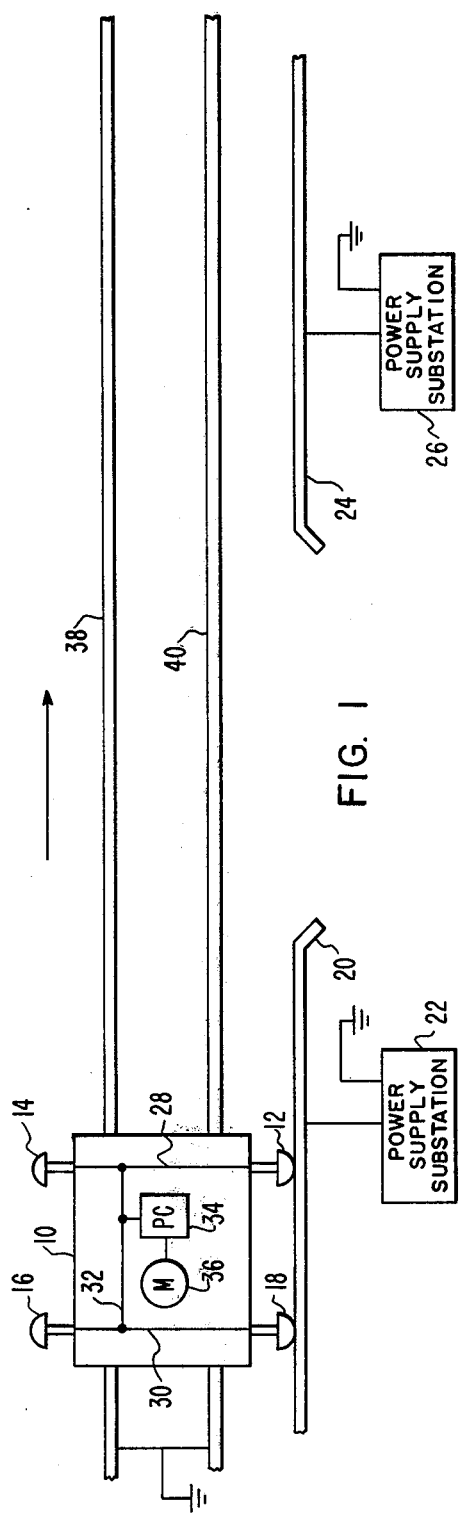
FIG. 1 schematically shows a transit vehicle operative with a power source third rail having a physical gap between adjacent power supply stations.

In FIG. 1, there is shown a transit vehicle 10 including power pick-up devices 12, 14, 16 and 18, with the pick-up devices 12 and 18 being operative with a power source third rail 20. The third rail 20 is energized by a power supply substation 22. A second power source third rail 24 is operative with a different power supply substation 26. The pick-up devices 12 and 14 are connected together by an electrical connection 28 and the pick-up devices 16 and 18 are connected together by a connection 30. A connection 32 is coupled between the electrical connections 28 and 30 and is connected to a propulsion control 34 operative with a propulsion motor 36. The vehicle 10 is operative with conventional support tracks 38 and 40 and moves along the support tracks in a direction indicated by the arrow, such that as the vehicle continues to move from the position shown in FIG. 1, the pick-ups 12 and 18 will pass from the third rail 20 through the physical gap between the third rails and then onto the third rail 24 as it travels along the support tracks 38 and 40.

Figure 2:
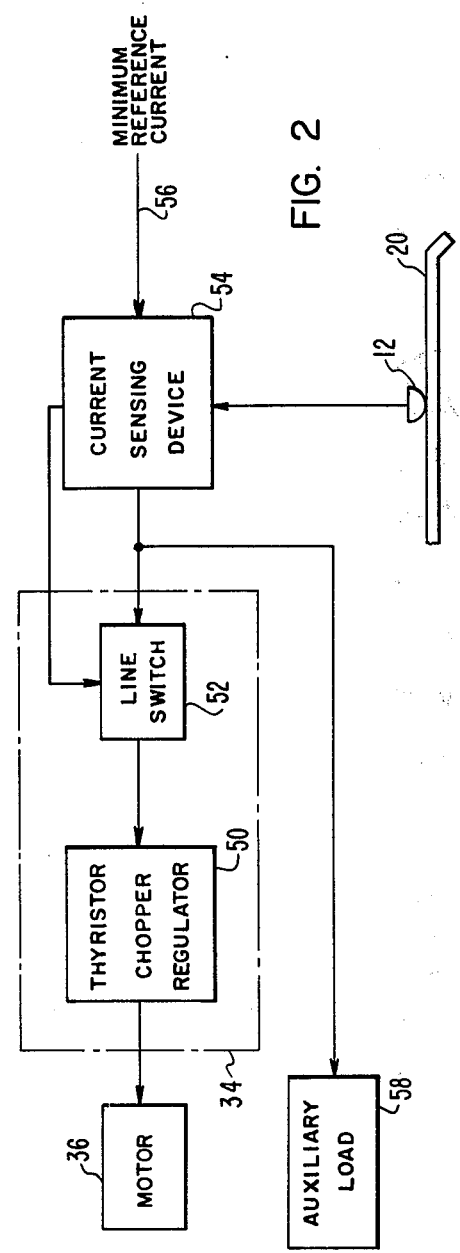
FIG. 2 functionally shows the operation of the present invention for preventing regenerative braking by the transit vehicle when the third rail is dead or has a gap at the vehicle location.

In FIG. 2, there is functionally shown the regenerative braking control apparatus of the present invention that is operative for preventing regenerative braking by the transit vehicle when the transit vehicle is passing through the gap between the respective power source third rail sections. In FIG. 2, there is shown the propulsion control 34 including a conventional thyristor chopper regulator 50 for regulating the current of the propulsion motor 36. A minimum current switch 52 is provided to determine the energization of the thyristor chopper regulator 50. A current sensing device 54 is connected in series with the pick-up 12 and the line switch 52 and is responsive to a minimum reference current 56 for determining the operation of the current switch 52. In addition, the auxiliary load 58 of the transit vehicle, which auxiliary load includes the lights, battery charger, air compressors, heaters, air conditioning, and so forth, is energized from the third rail 20 and pick-up 12 through the current sensing device 54 as shown in FIG. 2.

Figure 3:
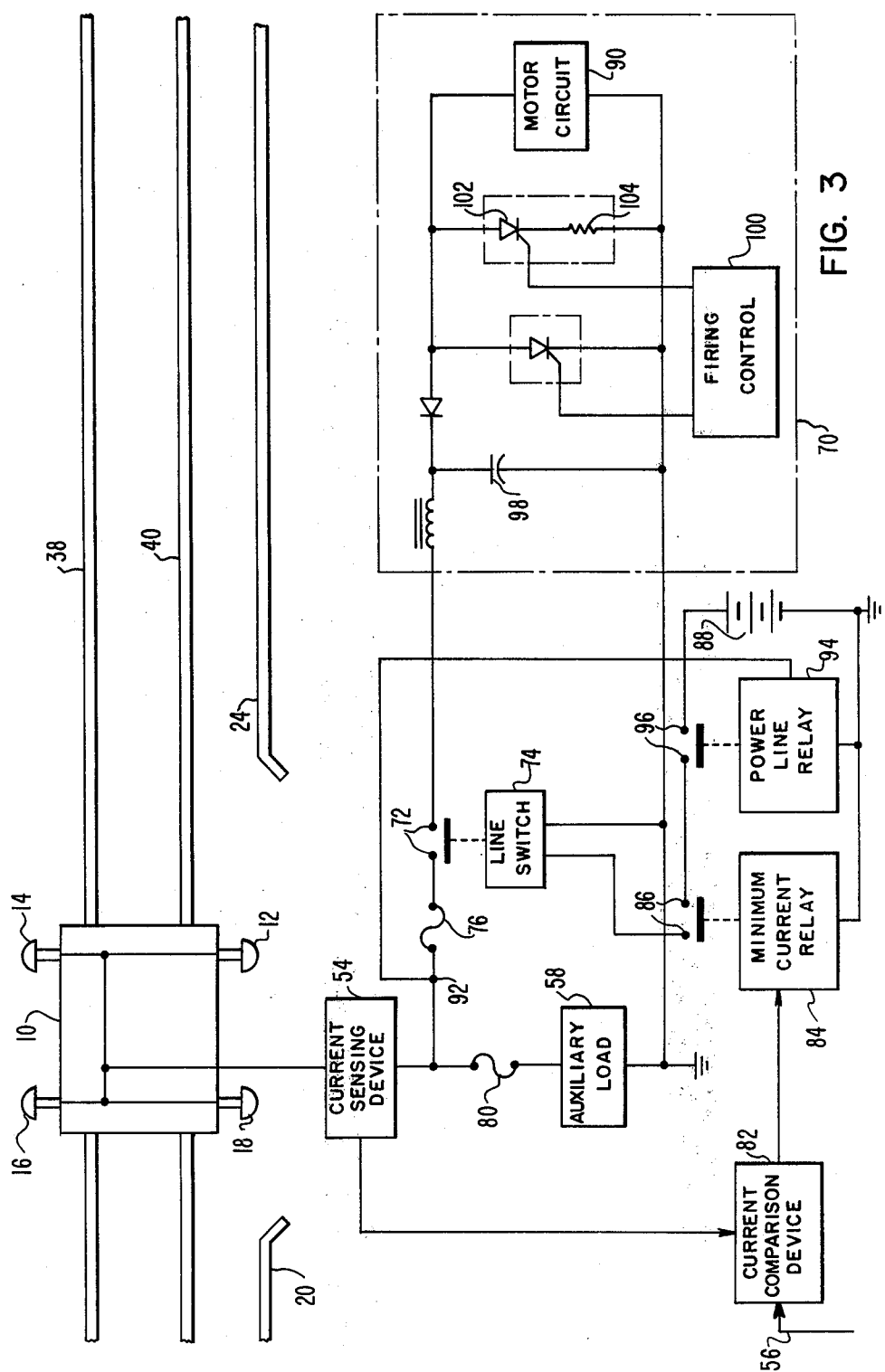
FIG. 3 illustrates the application of the present invention in relation to determining the suitability of regenerating power into the power source third rail.

FIG. 3 illustrates the application of the present invention in relation to determining the suitability of regenerating power into the third rail. A conventional chopper system 70 such as used with series motors is carried by the vehicle and shown connected through the contacts 72 of a line switch 74, a fuse 76, the current sensing device 54, and to the pick-ups 12, 14, 16 and 18 of the vehicle 10. The auxiliary load 58 is connected through a fuse 80 and through the current sensing device 54 to receive power from the pick-ups 12, 14, 16 and 18 of vehicle 10. As shown in FIG. 3, the vehicle 10 is positioned in the gap between the third rail 20 and the third rail 24 such that there is no power being supplied from the third rail through the current sensing device 54 to energize the auxiliary load 58; therefore, the current sensing device 54 does not sense a minimum auxiliary load current for the current comparison device 82, which receives an input reference signal 56 in accordance with this predetermined minimum auxiliary load current. Therefore, the current comparison device 82 deenergizes the minimum current relay 84 to open the contacts 86 and prevent the energization of the line switch 74 from the battery 88 such that the line switch 74 would then open the contact 72 and prevent regenerative braking current from the motor circuit 90 within the chopper system 70 from passing through the switch contacts 72 and going back through the pick-ups 12 and 18 to energize the third rail 24 when contact with pick-up shoe is obtained. In accordance with the present invention, it is desired when the pick-ups 12 and 18 are not in contact with one of the third rails 20 or 24, or if the pick-ups 12 and 18 are in contact with a third rail which has been deenerigzed or made dead for some reason such as for the safety of maintenance personnel, it is desired in accordance with the present invention that the regenerative braking current not be permitted to go back through the pick-ups 12 and 18 into that deenergized third rail.

When the pick-ups 12 and 18 are in contact with the third rail 24 after the vehicle 10 has passed through the gap between the third rail 20 and the third rail 24, and if at this time the third rail 24 is energized since it is desired that the vehicle 10 be propelled along the support tracks 38 and 40, then the current sensing device 54 will sense at least the minimum auxiliary load current of the auxiliary load 58 and provide an actual current signal to the current comparison device 82 greater than the reference minimum current signal 56 such that at this time, the minimum current relay 84 would be energized to close the contacts 86. Since voltage now appears at circuit junction 92 the power line relay 94 closes the contacts 96 such that now the battery 88 would energize the line switch 74 to close the contact 72. During this operation with an energized third rail 24 if the automatic train operation control system or the operator desired the vehicle to stop then regenerative braking of the vehicle would be permitted and the regenerative braking current from the motor circuit 90 could now pass through the contact 72, the fuse 76 and to the pick-up devices 12 and 18 to supply power back to the third rail 24.

If the vehicle 10 should pass through another gap between third rail sections or if for some reason, the third rail 24 should be deenergized and made dead for some reason such as desired maintenance of the transit system in an area adjacent to that third rail and the safety of personnel would become involved, the current sensing device 54 would then sense that the auxiliary load 58 was not receiving at least a minimum auxiliary load current and the current comparison device 82 would open the minimum current relay 84 contacts 86 to deenergize the line switch 74 which would open the contacts 72 and in this way, regenerative braking current from the motor circuit 90 would not be permitted to pass back through the pick-ups 12 and 18 to the deenergized power source third rail.

When the line switch 74 opens its contact 72 during the braking mode of operation of the vehicle 10, the propulsion motor generated current will result in an increased voltage across the line filter capacitor 98 and cause the firing control 100 to operate the thyristor 102 in conjunction with the dynamic braking resistor 104 in accordance with the teachings of the above reference published article and U.S. Pat. No. 3,657,625 of Miller et al. Upon the subsequent reenergization of the third rail or the vehicle completing its passage through the gap between the third rail sections and again becoming operative with an energized third rail, the current sensing device 54 would then sense a minimum auxiliary load current and through operation of the current comparison device 82 energize the minimum current relay 84 to close the contacts 86 and since the circuit junction 92 is again energized with voltage, the power line relay 94 would close the contacts 96 such that the line switch 74 would close the contact 72 and the regenerative braking current from the motor circuit 90 could again pass through the pick-ups 12 and 18 to the power source third rail.

We claim:

1. In regenerative braking control apparatus for a transit vehicle having a propulsion motor circuit and an auxiliary load and being operative in a brake mode with a power source conductor, the combination of:
   first means for determining the connection of the propulsion motor circuit to said power source conductor for supplying regenerated current to said conductor during the braking operation of the vehicle,
   second means for sensing the actual current supply to the auxiliary load by the power source conductor, and
   third means for comparing said actual current with a predetermined reference current and being operative with the first means to disconnect the propulsion motor circuit from the power source conductor when said actual current is less than the reference current.

2. The regenerative braking control apparatus of claim 1, including:
   fourth means for sensing the voltage across the propulsion motor circuit when the power source conductor energizes that propulsion motor circuit, with the fourth means being operative with the first means to disconnect the propulsion motor circuit from the power source conductor when said voltage is not provided by the power source conductor.

3. The regenerative braking control apparatus of claim 1:
   with the second means sensing said actual current in relation to the current supplied to the auxiliary load by the power source conductor.

4. In regenerative braking control apparatus for a transit vehicle having a propulsion motor circuit and an auxiliary load and being operative with a power source third rail conductor, the combination of:
   switch means for connecting the propulsion motor circuit to said third rail conductor for supplying regenerated current to the third rail conductor during the braking operation of the vehicle,
   sensing means for determining the actual current supplied to at least the auxiliary load of the vehicle from the third rail conductor, and
   control means for determining the relationship of said actual current with a predetermined reference current and operative with said switch means for disconnecting the propulsion motor circuit from the third rail conductor when the actual current is less than the reference current.

5. The regenerative braking control apparatus of claim 4, including:
   means for sensing the voltage provided by the third rail conductor across the propulsion motor circuit and operative with said switch means for disconnecting the propulsion motor circuit from the third rail conductor in accordance with the provision of that voltage.

6. The regenerative braking control apparatus of claim 4:
   with said sensing means being responsive to the current supplied to the auxiliary load for determining said actual current.

* * * * *